United States Patent
Zambetti et al.

(10) Patent No.: US 9,317,047 B2
(45) Date of Patent: Apr. 19, 2016

(54) ADAPTIVE REACTIVATION OF PHASES DEACTIVATED BY PHASE-SHEDDING IN MULTI-PHASE VOLTAGE REGULATORS

(71) Applicant: STMicroelectronics S.r.l., Agrate Brianza (IT)

(72) Inventors: Osvaldo Enrico Zambetti, Milan (IT); Daniele Giorgetti, Corbetta (IT); Alessandro Zafarana, Milan (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 217 days.

(21) Appl. No.: 14/014,896

(22) Filed: Aug. 30, 2013

(65) Prior Publication Data

US 2014/0062430 A1    Mar. 6, 2014

(30) Foreign Application Priority Data

Aug. 31, 2012  (IT) ................ MI2012A1460

(51) Int. Cl.
| | |
|---|---|
| *G05F 1/00* | (2006.01) |
| *G05F 1/10* | (2006.01) |
| *H02M 3/158* | (2006.01) |
| *H02M 1/00* | (2007.01) |
| *H02M 3/156* | (2006.01) |

(52) U.S. Cl.
CPC .............. *G05F 1/10* (2013.01); *H02M 3/1584* (2013.01); *H02M 2001/0032* (2013.01); *H02M 2003/1566* (2013.01); *Y02B 70/16* (2013.01)

(58) Field of Classification Search
CPC ........... G05F 1/10; H02M 2001/0032; H02M 3/1584; H02M 2003/1566; Y02B 70/16
USPC ................................. 323/277, 272
See application file for complete search history.

(56) References Cited

U.S. PATENT DOCUMENTS

| | | | | |
|---|---|---|---|---|
| 7,215,102 | B2 * | 5/2007 | Harris | H02M 3/1584 323/268 |
| 7,592,787 | B2 * | 9/2009 | Qui | H02M 3/285 323/272 |
| 7,615,982 | B1 * | 11/2009 | Guo | H02M 3/1584 323/271 |
| 7,885,088 | B2 | 2/2011 | Zambetti et al. | |
| 2005/0184717 | A1 | 8/2005 | Walters | |
| 2007/0236205 | A1 | 10/2007 | Zambetti et al. | |
| 2008/0024104 | A1 | 1/2008 | Yamada | |
| 2008/0303495 | A1 | 12/2008 | Wei et al. | |

(Continued)

*Primary Examiner* — Jessica Han
*Assistant Examiner* — Lorena Bruner
(74) *Attorney, Agent, or Firm* — Seed IP Law Group PLLC

(57) ABSTRACT

In a multi-phase power supply voltage regulator functioning at a nominal switching frequency, one or more phases are kept off for optimizing energy efficiency at relatively low load conditions. Reactivation of stand-by phases in response to a load increase transient is made more efficiently by exploiting information already present in the output voltage control loop. The technique comprises a) deriving from the control loop information on the equivalent nominal switching frequency given by the product of the nominal switching frequency by the number of active phases; b) updating at every beat of a clock signal the instantaneous value of the equivalent switching frequency; c) determining the band of equivalent switching frequency values to which the instantaneous value belongs; d) logically combining the equivalent switching frequency information with a determined band of output current level, for switching on one or more stand-by phases in response to a load increase transient.

15 Claims, 6 Drawing Sheets

(56) References Cited

U.S. PATENT DOCUMENTS

| | | | |
|---|---|---|---|
| 2009/0174374 A1 | 7/2009 | Sutardja et al. | |
| 2009/0224731 A1* | 9/2009 | Tang et al. | 323/241 |
| 2009/0256535 A1* | 10/2009 | Houston | H02M 3/1584 323/262 |
| 2010/0315052 A1* | 12/2010 | Zambetti et al. | 323/282 |
| 2011/0234193 A1* | 9/2011 | Laur | H02M 3/1584 323/311 |
| 2011/0241636 A1* | 10/2011 | Wu | H02M 3/1584 323/272 |
| 2011/0241640 A1* | 10/2011 | Qiu | H02M 3/1584 323/283 |
| 2012/0161741 A1 | 6/2012 | Zambetti | |
| 2013/0057240 A1 | 3/2013 | Zambetti et al. | |

\* cited by examiner

ADAPTIVE REACTIVATION OF PHASES DEACTIVATED BY PHASE-SHEDDING IN MULTI-PHASE VOLTAGE REGULATORS

BACKGROUND

1. Technical Field

This disclosure relates in general to multi-phase voltage regulators and in particular to optimized management techniques of the phase regulators in order to reduce power consumption, enhancing the energetic efficiency of the multi-phase power supply system.

2. Description of the Related Art

Multi-phase voltage regulators are widely employed for powering servers, CPUs, notebooks and workstations. Lately efforts have been made for optimizing efficiency of this class of regulators by dynamically intervening on the number of active phases depending on the level of current absorbed by the load. In fact, by tracing the efficiency graph in function of the load current and of the number of phases, it may be observed that at low loads an improved efficiency is achieved by decreasing the number of active phases. A technique called phase-shedding is used for switching off a certain number of phases when the electrical load decreases, in order to achieve an optimal efficiency curve.

A well known technical problem of phase-shedding is the latency (delay) in reactivating switched off phases in presence of a load transient.

To optimize the response of the multi-phase system, it is important that during a load increase transient a number of phases in excess of what would be necessary for coping with the new regime of augmented absorption be reactivated, among those available. In order to understand better the problem, it may be useful to make an example.

Referring to FIG. 1, let us suppose that a four phase system (1PH, 2PH, 3PH, 4PH,) is functioning with only one phase in order to improve efficiency given than the output current remains very low. If a high load transient (e.g. 100 A) occurs, it would be ideal to be able to immediately use all the four phases available for responding to the load transient in a decisive manner for minimizing a "hole" (sagging) of the output voltage, rather than having to wait that the switch-on threshold of the second phase be surpassed, as depicted in FIG. 2, and then again that of the third phase and so forth.

If this adaptive process would not occur and the system responded with a single phase for almost the whole transient, the output voltage would undergo an abrupt drop because a single phase could not sustain a large transient. In practice, the system would have to wait that the current delivered by the active first phase reaches the triggering threshold in order to switch on the second phase. When the current of the first phase summed to that delivered by the second phase reaches the triggering threshold level of the third phase, then also the third phase will be able to turn on and so forth. It is evident that the time for reaching a point at which all four phases are active becomes relatively long and in order to limit the drop of the output voltage to acceptable levels, large storing capacitors are used, thus increasing costs of the application.

The major part of commercially available multi-phase voltage regulators, use nonlinear response methods to load transients. Basically, a load transient is detected by setting a threshold on the output voltage or monitoring its derivative (re: the so called Load Transient Boost (LTB) technique, disclosed in US 2007/0236205-A1). When a load increase transient is detected, all available phases are switched on.

These methods respond violently (by turning on all the phases) and therefore it may happen that a transient of modest magnitude or relatively gradual be not detected or that a transient just surpassing the triggering threshold cause the switching on of all the phases (which in server applications may be up to six or even eight) when the switching on of just a reduced number of available phases would be sufficient.

Variable frequency control methods of voltage regulators, for example a constant-on-time VCOT system as that disclosed in U.S. Patent Application Publication No. 2013/0057240, by the same applicant, respond to load transients in a linear manner, by increasing the switching frequency in function of the increased current absorbed by the load.

BRIEF SUMMARY

The herewith disclosed novel technique rests on the fact that a multi-phase power supply system practically functions with a variable switching frequency. Generally, the control loop of a multi-phase system contemplates a control of the average switching frequency (FSW) (in order to ensure a certain nominal frequency of operation).

According to one embodiment of the present disclosure, the information on the current absorption by the load that is normally present within the output voltage control loop of a multi-phase power supply system with a control of the switching frequency is exploited for implementing a more efficient management of the number of active phases.

When an increase of the electrical load of the power supply system takes place, an opportunity of switching on other phases of the power supply system manifests itself within the frequency control loop in form of an increment of the switching frequency. The larger the load increment, the greater will be the increment of the switching frequency during the load transient. In practice, this type of control allows to predict the expected equivalent switching frequency.

Supposing that the system be functioning statically with the number N of active phases the equivalent switching frequency of the multi-phase of supply system is FSW*N.

If at a certain point of time an additional load is applied to the power supply system or for any other reason the absorption of current from the output node increases, in order to respond to an increased current absorption, the system will increase the switching frequency of the N active phases.

According to a first embodiment of this disclosure, the real switching frequency is measured and compared with what would be the nominal switching frequency for a number N+1 of phases.

If the real switching frequency, with N active phases is higher than what would be the nominal switching frequency with N+1 phases, the novel phase management system of the present disclosure switches on one more phase in addition to the N phases already active.

Alternatively, it is possible to compare the measured switching frequency not only with that relative to N+1 phases, but also to that relative to N+2, N+3, and so forth, thus allowing to choose straight away the new target number of phases (N+x) to be made active. This alternative embodiment, though proportionately more costly than the preceding one, may be very effective in a system having a large number of phases, because instead of evaluating at every increment of load when switching on one more phase, practically implementing a step by step adjustment algorithm, it evaluates at every transient how many more phases to be switched on.

In implementing this disclosure, it is useful to contemplate also a certain period of time from the instant of intervention of the management system of the number of active phases, during which, the information generated by the monitor of the current absorbed from the output node of the multi-phase power supply system is temporarily masked, in view of the fact that the information would clearly not be coherently updated. This masking time may be established on the basis of the contemplated latency before getting, from the monitor of the delivered current, correct information (that is not affected by transitory effects).

It is remarked that the mechanism of managing the number of active phases involves the normal sensing of the delivered current, because the switching frequency under static conditions of operation does not provide information on the load because it remains practically constant and equal to the nominal value FSW*N, where N represents the number of presently active phases.

The novel method herein disclosed allows to effectively evaluate how many active phases to use in the system even before the information arrives from the output current monitor, exploiting the information that is already intrinsically contained in the feedback control loop of the variable frequency system.

According to this disclosure, the decision of switching on one more phase is made without even needing to read the current being delivered because the decision is based directly on the response of the control loop to a drop of the output voltage consequent to the application/increase of the load.

The novel method makes the system react even more quickly than a method based on actually reading the delivered current, even if it had no latency, which, before reacting by switching on one more phase, would wait for the already active phase or phases to provide all the current that would trigger the mechanism of increasing the number of active phases.

Several embodiments are described in detail herein below with the sole aim of illustrating examples of possible circuital implementations and/or of the obtained results, making reference also to the attached drawings. Naturally, innumerable other alternative forms of circuital implementation are possible, as will be evident to the person of ordinary skill in the art, though remaining within the scope of this disclosure.

DETAILED DESCRIPTION

In general, an increase or a decrease of the number of active phases in a multi-phase system, as already said, is determined in an adaptive manner to deliver output current, for optimizing the efficiency of the system at different load currents. Clearly the number of active phases that the voltage regulator system has at steady state conditions of operation is determined by its output current. Therefore, the output current of any multi-phase voltage regulator system is monitored. Generally, the output current information is read from a common current sense circuital arrangement and the information is compared with a number of thresholds in order to determine the band of output current values within which the power supply system is functioning. These thresholds should be programmable because the number of phases that should be made active in function of the current depends on the specific application, the type of power MOSFETs used, the switching frequency and other regulation parameters.

Figure 1:
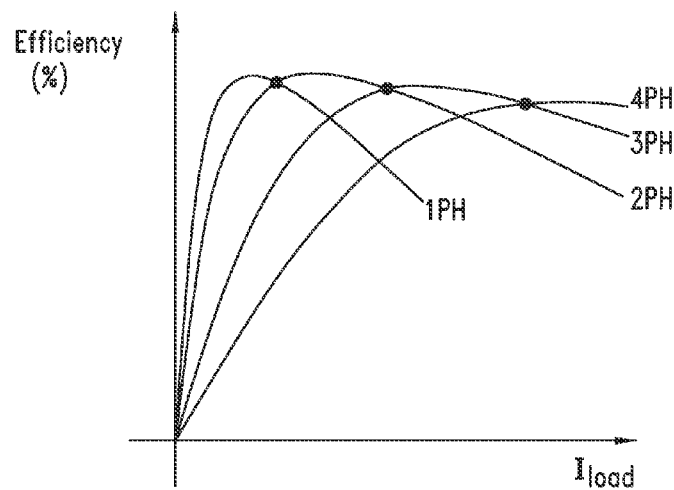
FIG. 1 is a illustrative diagram of the functioning of a four phases power supply system.
Figure 2:
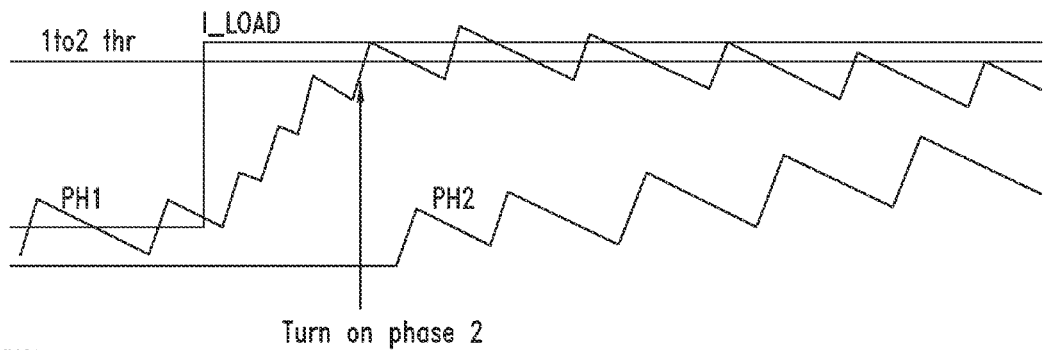
FIG. 2 shows waveforms of the currents provided by a first phase and by a second phase activated in response to a load increase transient.
Figure 3:
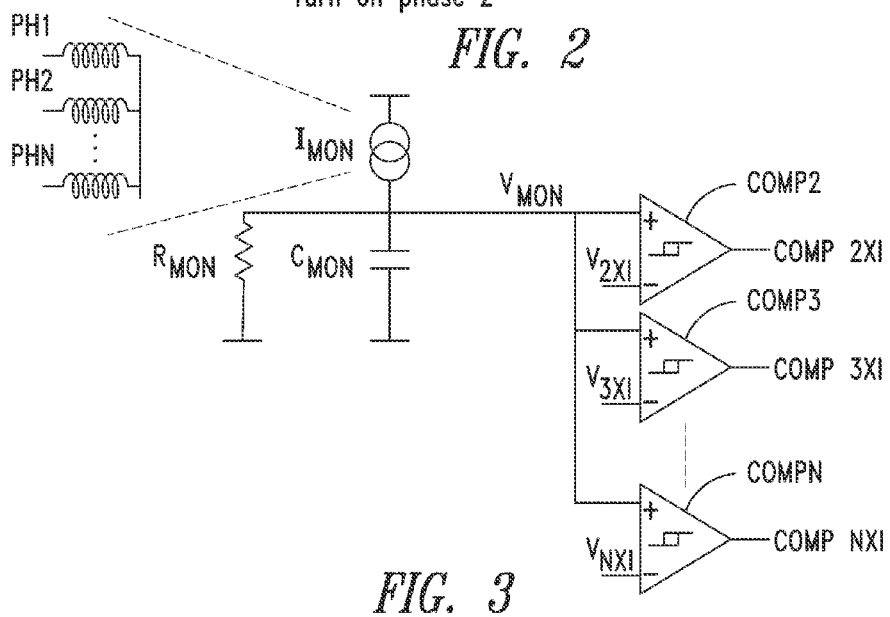
FIG. 3 shows a typical circuit diagram of a monitor of, by bands of level or value, the current being delivered by the system.

A typical example of a circuit adapted to monitor the band of output current in which the voltage regulator is working is depicted in FIG. 3.

The current IMON represents the output current of the regulator read by a common current sensor and represents the sum, suitably scaled, of the currents flowing in the active phases PH1, PH2, . . . , PHN.

The circuit of FIG. 3 includes a resistor RMON for converting the output current into a voltage signal $V_{MON}$. The circuit includes comparators COMP2, COMP3, . . . , COMPN that are configured to compare the voltage signal $V_{MON}$ to a plurality of threshold voltages V2XI, V3XI and VNXI, respectively, which are proportional to the threshold currents for passing from 1-to-2 phases, 2-to-3 phases and 3-to-4 phases, respectively. The circuit also includes a capacitor CMON which is a common filter capacitor for suppressing switching noise on the output voltage and/or for reducing the ripple present on the IMON signal.

The comparators each have an hysteresis representing the difference of threshold between passages from 1-to-2 and from 2-to-1 and so forth in order to avoid repeated triggerings of the comparator upon reaching a triggering threshold.

Figure 4:
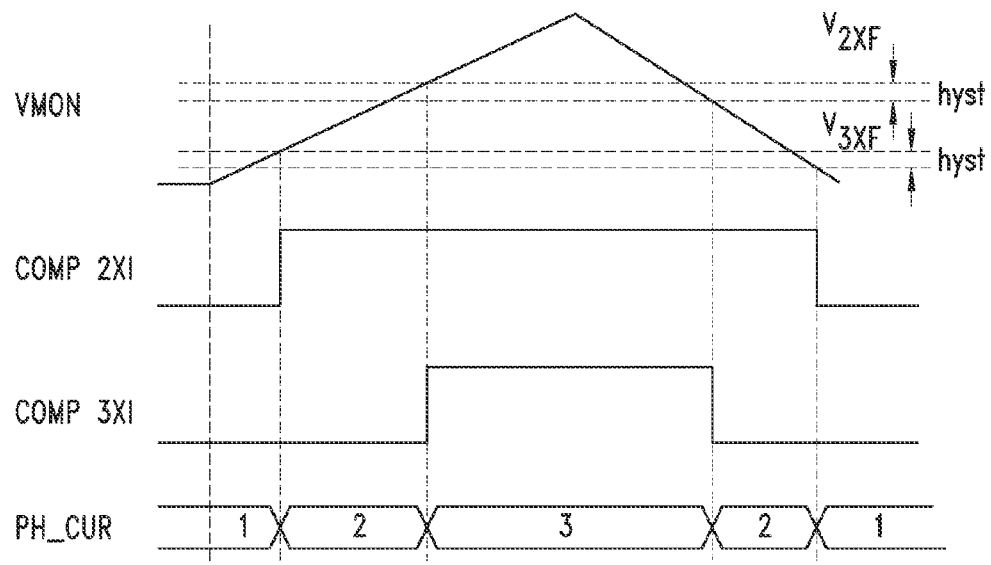
FIG. 4 shows a timing example of the signals of adaptive management of the number of active phases for a three phases system, according to a common technique.

FIG. 4 shows an example of timing of the signals of adaptive management of the number of activated phases of a three phases system, according to a common technique.

The VMON signal represents the output current information of the multi-phase power supply system. When the VMON signal surpasses the threshold V2XI, the output of the corresponding comparator rises. When VMON surpasses also the threshold V3XI, also the output of the comparator COMP2 rises. A reverse mechanism applies when the output current decreases, apart from the hysteresis of the comparators.

Commonly, the output logic value of the comparators are combined together through a simple combinatory logic circuit in order to generate the target number of phases PH_CUR, coherent with the current information.

Figure 5:
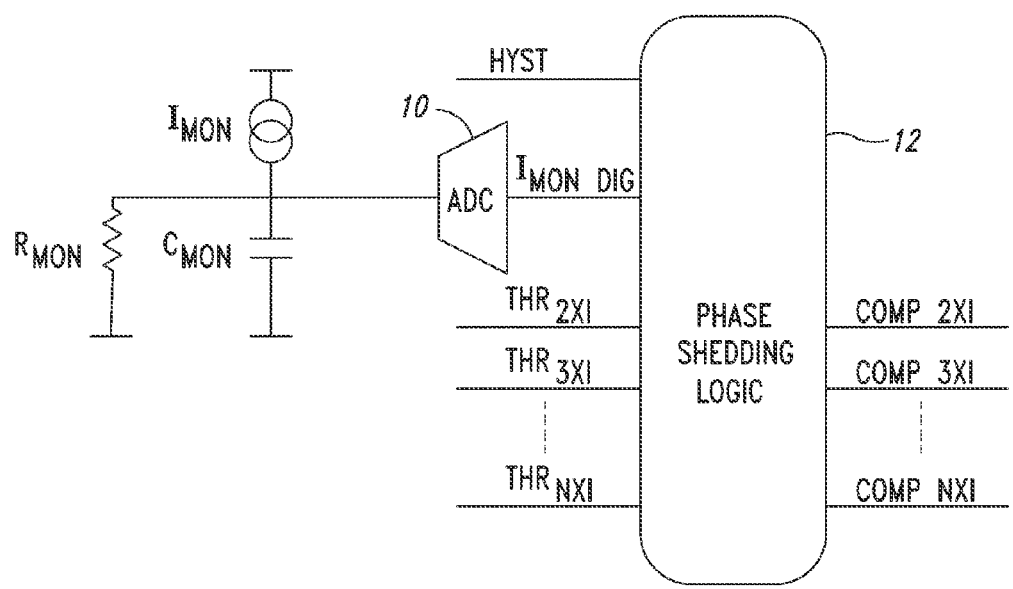
FIG. 5 shows an alternative circuit diagram of a monitor of the delivered current in digital form by converting the value of the delivered current in a digital datum.

A digital embodiment of the current mode control scheme as shown in FIG. 5 is also possible. Assuming that the output current value is converted to a digital datum by an ADC 10, it is possible to program digital threshold values (preferably with a certain hysteresis) and obtain the same information on the band of current levels of the current being delivered by the supply voltage regulator. In particular, a phase shedding logic block 12 can be used to generate the target number of phases PH_CUR As already said, this information on the band of values in which the output current being delivered is insufficient for establishing the number of phases that should be activated. In particular, during a load transient, the VMON information does not represent the load requirement because the voltage regulator hasn't yet responded to the transient.

Supposing that the voltage VMON is below the threshold value V2XI, the voltage regulator functions with only one active phase. If, in this condition of operation, a load increase transient takes place, the system would be subjected to a considerable drop of the output voltage.

This disclosure provides an outstandingly effective remedy to this inconvenience by preventing the drop of output voltage that would otherwise occur because of the load transient, by instantaneously incrementing the number of active phases of the system.

Figure 6:
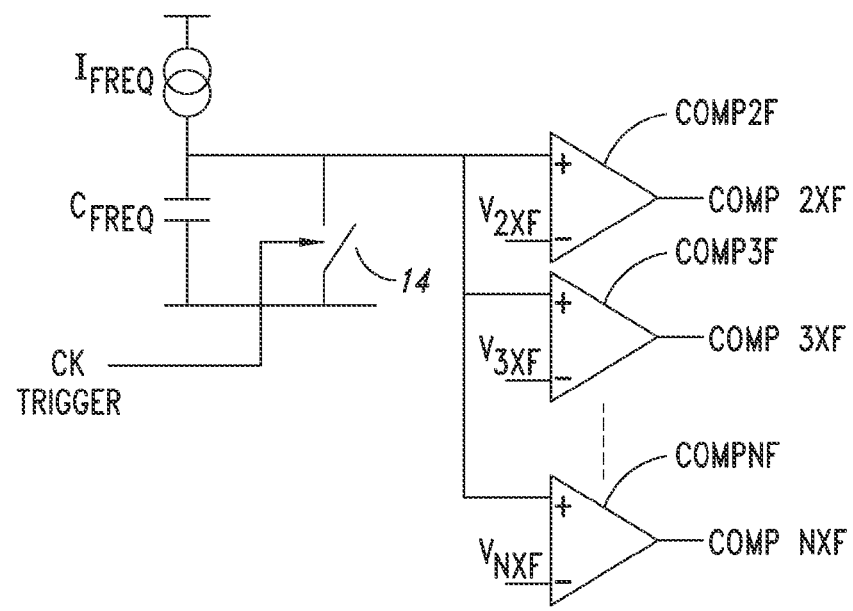
FIG. 6 is a basic diagram, according to an analogical type implementation, of a circuit for continuously updating (monitoring) the instantaneous value of the equivalent switching frequency of the power supply system, according to this disclosure.

A possible analog embodiment of a circuit for instantaneously incrementing the number of active phases of the system is depicted in FIG. 6.

Referring to the basic circuit diagram of the figure, IFREQ is a current proportional to the nominal switching frequency (that is the switching frequency programmed by the multiphase system). CFREQ is a capacitance sized in a way that the voltage on it rises by a certain quantity V1XT in a time equal to the nominal switching period TSW. The circuit of FIG. 6 also includes a switch 14, controlled by a signal CK_TRIGGER, and a set of comparators COMP2F, COMP3F, . . . , COMPNF.

The voltages V2XF, V3XF and VNFX may be obtained from a common divider ½, ⅓, . . . 1/N of the voltage V1XF.

CK_TRIGGER is a signal that, at system level, commands the switching on of a phase. Under static conditions of operation, the frequency of this signal is equal to N*FSW, where N represents the number of the phases.

By eliminating the CFREQ information at every beat of the CK_TRIGGER signal, it is possible to measure in which band of frequency the voltage regulator is functioning.

Figure 7:
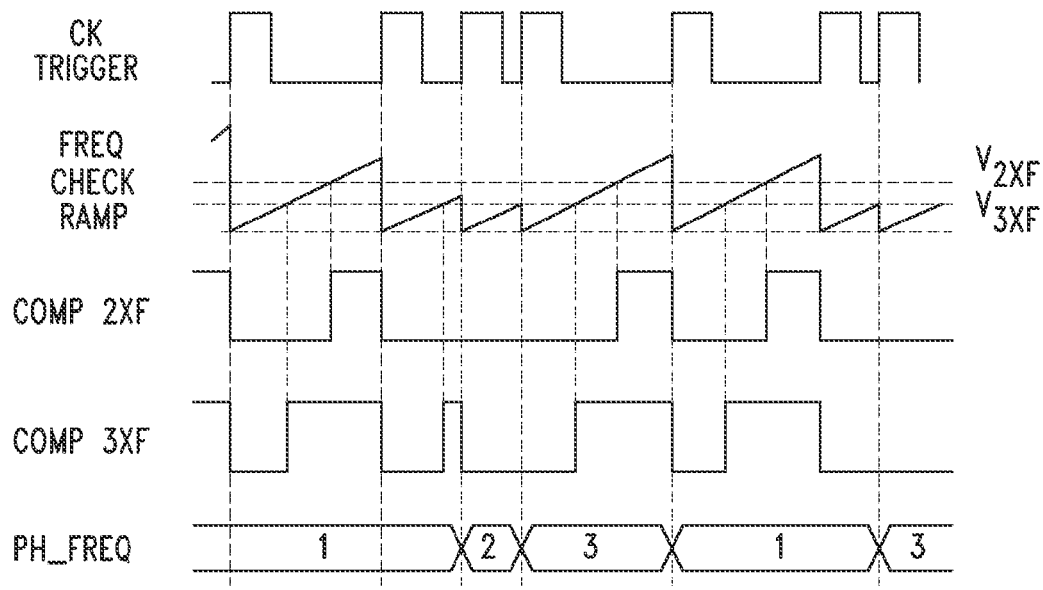
FIG. 7 shows a timing example of the signal of adaptive management of the number of active phases for a three phases system, according to the present disclosure.

In FIG. 7 a sample timing diagram for a generic three phase system is depicted.

At every beat of CK_TRIGGER, the voltage on the capacitance CFREQ, called FREQ CHECK RAMP, is made equal to zero by the switch 14. The capacitance integrates the IFREQ current proportional to the nominal frequency programmed by the system. When the voltage on the capacitance CFREQ surpasses the V3XF threshold, it means that the instantaneous system frequency is less than 3*FSW. When the voltage surpasses also the V2X threshold, it means that the instantaneous system frequency is less than 2*FSW. Is thus possible, at every clock beat, to store the state of the comparators COMP2F, COMP3F, . . . , COMPNF, and determine the band of switching frequency at which the system is operating.

At this point, two pieces of information are available: the target number of phases that is determined by the current information PH_CUR, and also the number of phases as determined by the information on the instantaneous switching frequency PH_FREQ.

Figure 8:
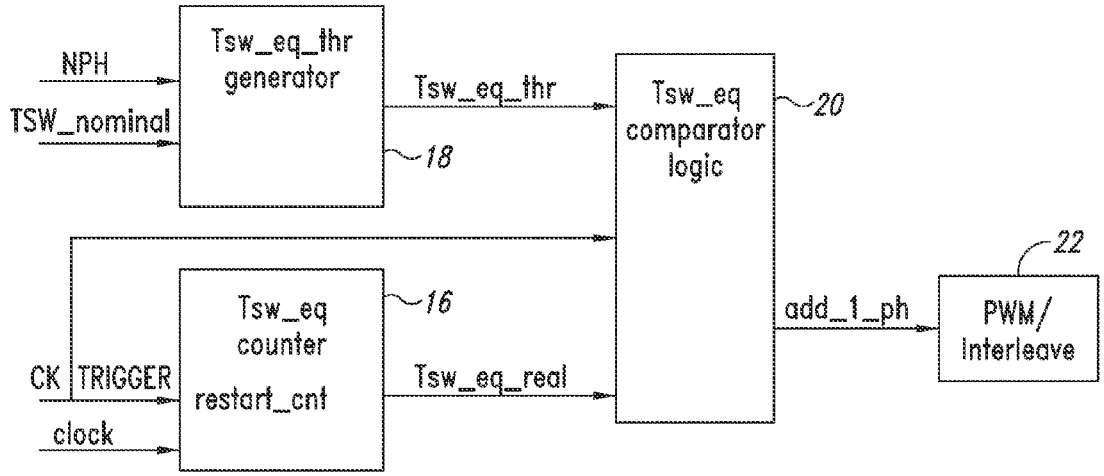
FIG. 8 shows an alternative basic diagram, according to a digital type implementation, of a circuit for continuous updating (monitoring) the instantaneous value of the equivalent switching frequency of the power supply system, according to this disclosure.

In FIG. 8 an alternative digital embodiment (typically of lesser cost than an analog embodiment) is schematically depicted, according to which the calculation of the duration of the real switching period Tsw real is carried out by a simple counter 16 which receives a clock and the CK_TRIGGER signal.

The block Tsw_eq_thr generator is a threshold generator 18 that generates the threshold Tsw_eq_thr below which the system of switching on again available phases should intervene. In practice it will be Tsw_eq_thr=TSW_nominal/(NPH+1).

The digital comparator 20 compares Tsw real and the threshold Tsw_eq_thr and generates as output the command add_1_ph, that can be handled by a logic circuit block pwm/interleaving 22 as a command for adding a phase to those already active.

Figure 9:
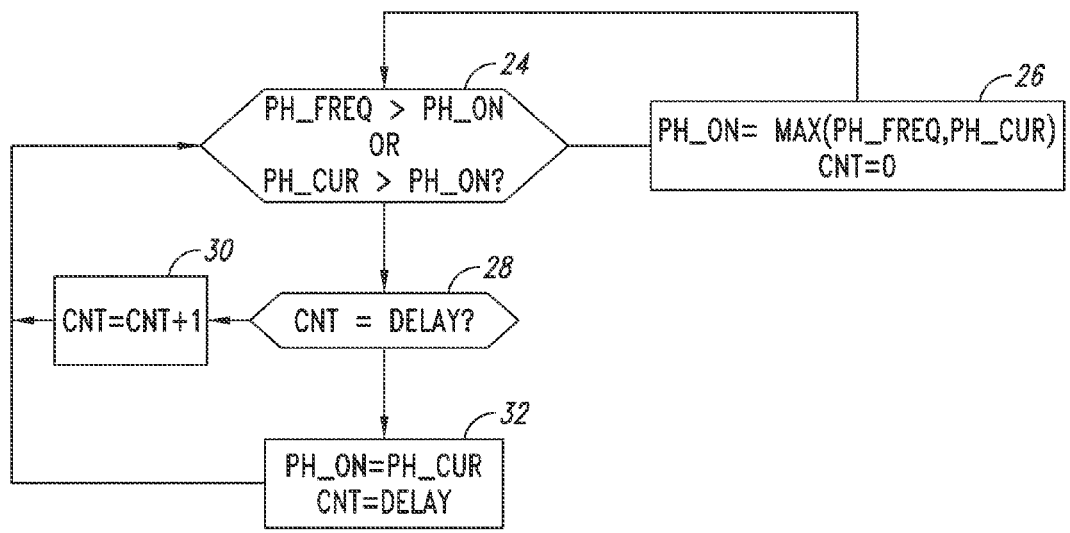
FIG. 9 is an exemplary decisional flow of the method implemented by the combinatory logic circuitry block for determining the number of phases to be made active, according to an embodiment of the system of this disclosure.

According to a first embodiment the decisional flow for determining the number of phases to be kept on may be as depicted in FIG. 9.

In this example of decision flow, PH_ON represents the number of phases to be kept on, PH_FREQ represents the current number of active phases according to the frequency control loop of the constant-on-time system being considered, PH_CUR represents the target number of phases according to the output current control, CNT represents a generic counter and DELAY represents a programmable delay (it may be also zero) for which the system, once having incremented the number of active phases, waits for the counter CNT reach a certain DELAY, before eventually intervening to decrement anew the number of active phases.

In step 24, the method determines whether PH_FREQ or PH_CUR is greater than PH_ON. If so, then in step 26 the method sets PH_ON to the maximum of PH_FREQ and PH_CUR and sets CNT to zero. If neither PH_FREQ nor PH_CUR is greater than PH_ON, then the method determines whether CNT equals DELAY in step 28. If not, then CNT is incremented in step 30 and the method returns to step 24. If CNT equals DELAY, then in step 32 the method sets PH_ON equal to PH_CUR.

Figure 10:
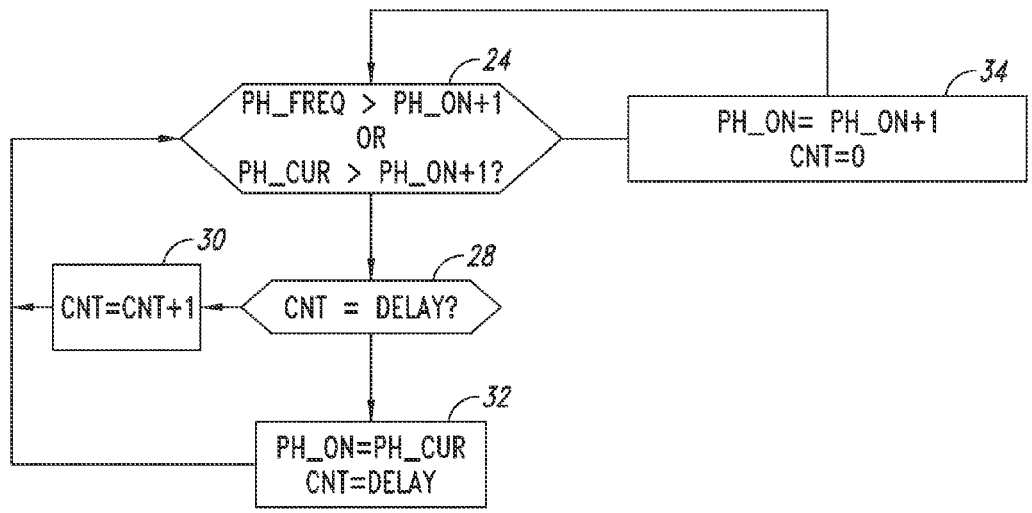
FIG. 10 is an alternative decisional flow of the method implemented by the combinatory logic circuitry block for determining the number of phases to be made active, according to another embodiment of the system of this disclosure.

According to an alternative embodiment, the decision flow for determining the number of phases to be kept active, according to which the number of phases is incremented by one phase at the time (stepwise) may be as illustrated in FIG. 10. The steps of the method of FIG. 10 are the same as the method of FIG. 9 except that step 26 is replaced with step 34 which increments PH_ON by one rather than changing PH_ON to the maximum of PH_FREQ and PH_CUR.

Figure 11:
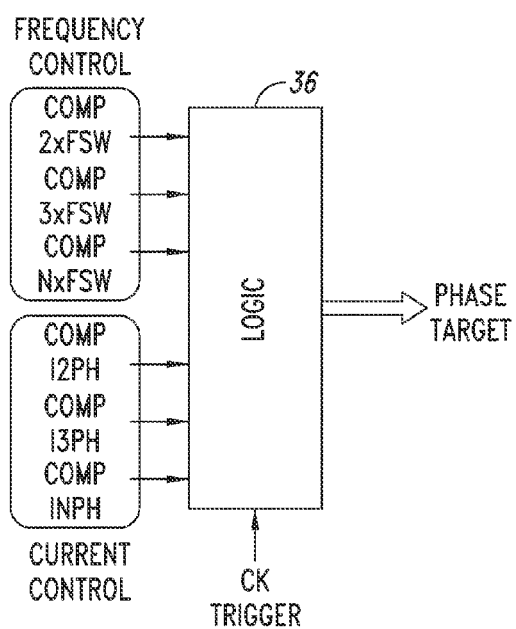
FIG. 11 is an exemplary representation of inputs and outputs of the management logic block of a system of this disclosure.

FIG. 11 is a representation of the inputs/outputs of a logic circuitry block 36 adapted to manage the number of active phases upon changes of the electrical load, according to a digital embodiment of this disclosure.

Figure 12:
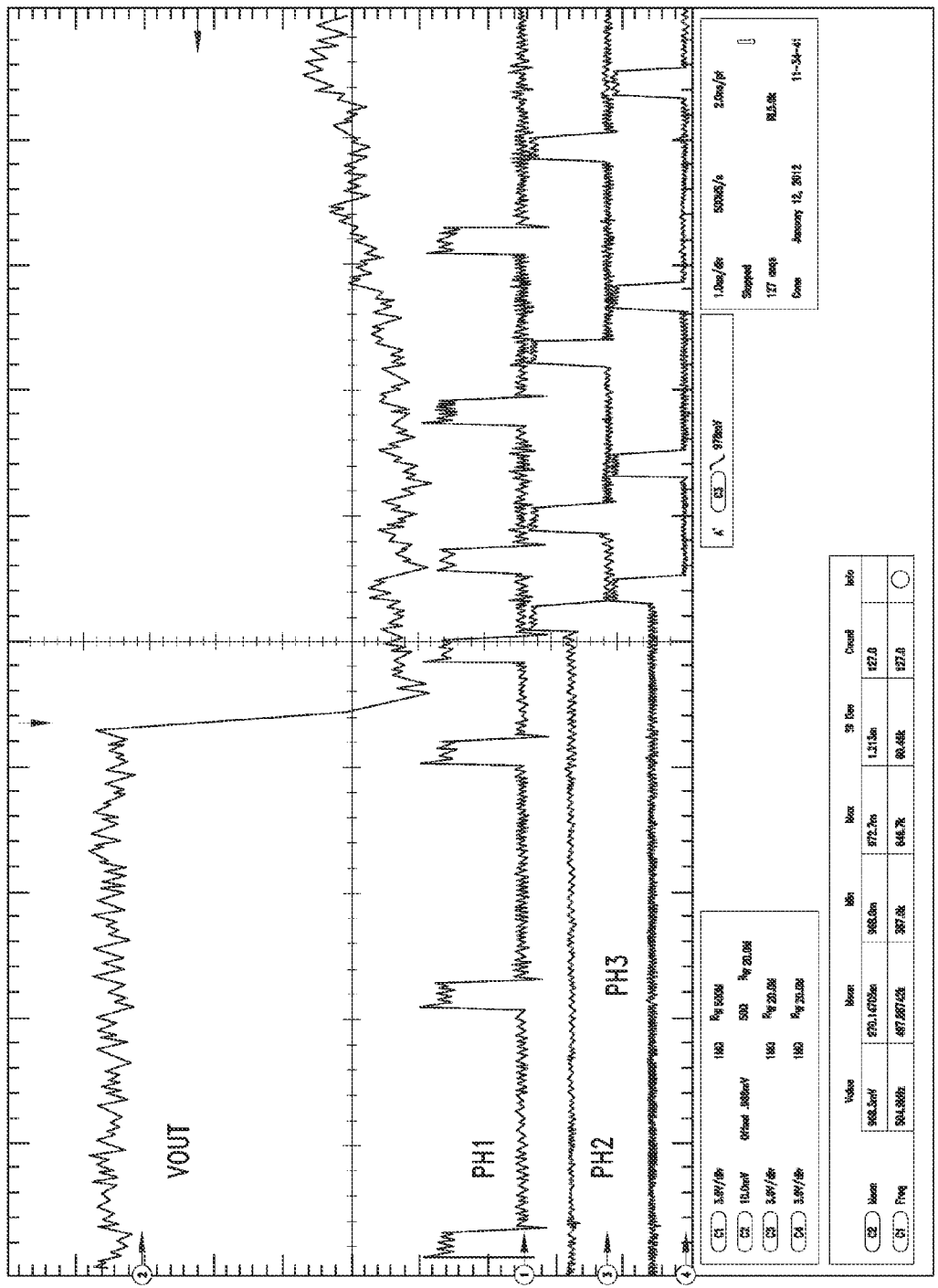
FIG. 12 reproduces oscillographs of waveforms of the signals that illustrate the behavior of a system of reactivation of phases according to this disclosure, realized in digital form.

FIG. 12 reproduces oscillographs of signal waveforms that illustrate the behavior of the novel system of re-activation of stand-by phases of the multi-phase power supply system, realized in digital form.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
adaptively switching off one or more phases of a multi-phase power supply voltage regulator to increase energy efficiency at relatively low load conditions of operation, the voltage regulator being configured to function at a nominal switching frequency, the switching off leaving active a number of active phases of the voltage regulator;
determining a band of current output levels, among a plurality of bands, corresponding to the number of active phases; and
keeping off the multi-phase power supply voltage regulator for optimizing energy efficiency at relatively low load conditions of operation, based on the determining, the adaptively switching including:
deriving information on an equivalent switching frequency equal to a product of said nominal switching frequency by the number of phases that are active;
updating at every beat of a clock signal an instantaneous value of the equivalent switching frequency;
determining a band of equivalent switching frequency values, among a plurality of bands, to which said instantaneous value of the equivalent switching frequency belongs; and
logically combining said band of equivalent switching frequency values and said band of output current levels, for switching on one or more stand-by phases in response to a load increase transient.

2. The method of claim 1, wherein:
determining the band of output current levels among the plurality of current level bands includes comparing them with thresholds of separation between adjacent bands, with a non-null hysteresis.

3. The method of claim 1, wherein the deriving, updating, and determining are implemented with analog circuits.

4. The method of claim 1, wherein the deriving, updating, and determining are implemented with digital circuits.

5. The method of claim 1, wherein from an instant of switching on of said one or more stand-by phases, their switching off is inhibited for a programmed delay time.

6. A multi-phase power supply voltage regulator configured to function at a nominal switching frequency, comprising:
a plural number of phases;
a variable frequency controller configured to set the nominal switching frequency; and
a phase switching controller configured to switch off one or more of the phases to optimize energy efficiency at relatively low load conditions of operation, the controller including:
a sensor configured to sense an instantaneous current absorbed by a load;
a first comparator configured to determine a band of output current levels among a plurality of bands corresponding to the number of phases of the multi-phase power supply voltage regulator;
a frequency detector configured to detect an equivalent switching frequency given by a product of said nominal switching frequency by a number of the phases that are active, the frequency detector being configured to update the detected equivalent switching frequency at every beat of a clock signal;
a second comparator configured to compare the updated detected equivalent switching frequency with a plurality of thresholds and determine a band of equivalent switching frequency values, among said plurality of thresholds, to which the updated detected equivalent switching frequency belongs; and
a combinatory logic circuit block configured to logically combine said determined band of output current levels and the determined band of equivalent switching frequency values, and switch on one or more stand-by phases of the plurality of phases in response to a load increase transient.

7. The multi-phase power supply voltage regulator of claim 6, wherein said first and second comparators each have a non-null hysteresis.

8. The multi-phase power supply voltage regulator of claim 6, wherein said frequency detector and second comparator are analog circuits.

9. The multi-phase power supply voltage regulator of claim 6, wherein said frequency detector and second comparator are digital circuits.

10. The multi-phase power supply voltage regulator of claim 6, further comprising a delay block configured to inhibit, for a programmed delay time starting from an instant of switching on of said one or more stand-by phases, the switching off of said one or more stand-by phases.

11. A control system configured to control a multi-phase power supply voltage regulator that includes a plural number of phases;
a variable frequency controller configured to set a nominal switching frequency of the multi-phase power supply voltage regulator; and
a phase switching controller configured to switch off one or more of the phases to optimize energy efficiency at relatively low load conditions of operation, the controller including:
a sensor configured to sense an instantaneous current absorbed by a load;
a first comparator configured to determine a band of output current levels among a plurality of bands corresponding to the number of phases of the multi-phase power supply voltage regulator;
a frequency detector configured to detect an equivalent switching frequency given by a product of said nominal switching frequency by a number of the phases that are active, the frequency detector being configured to update the detected equivalent switching frequency at every beat of a clock signal;
a second comparator configured to compare the updated detected equivalent switching frequency with a plurality of thresholds and determine a band of equivalent switching frequency values, among said plurality of thresholds, to which the updated detected equivalent switching frequency belongs; and
a combinatory logic circuit block configured to logically combine said determined band of output current levels and the determined band of equivalent switching frequency values, and switch on one or more stand-by phases of the plurality of phases in response to a load increase transient.

12. The control system of claim 11, wherein said first and second comparators each have a non-null hysteresis.

13. The control system of claim 11, wherein said frequency detector and second comparator are analog circuits.

14. The control system of claim 11, wherein said frequency detector and second comparator are digital circuits.

15. The control system of claim 11, further comprising a delay block configured to inhibit, for a programmed delay time starting from an instant of switching on of said one or more stand-by phases, the switching off of said one or more stand-by phases.

* * * * *